March 14, 1950 — L. A. BOLAND — 2,500,270
HOG FEEDER
Filed Nov. 20, 1945 — 2 Sheets-Sheet 1

Inventor
LEE A. BOLAND

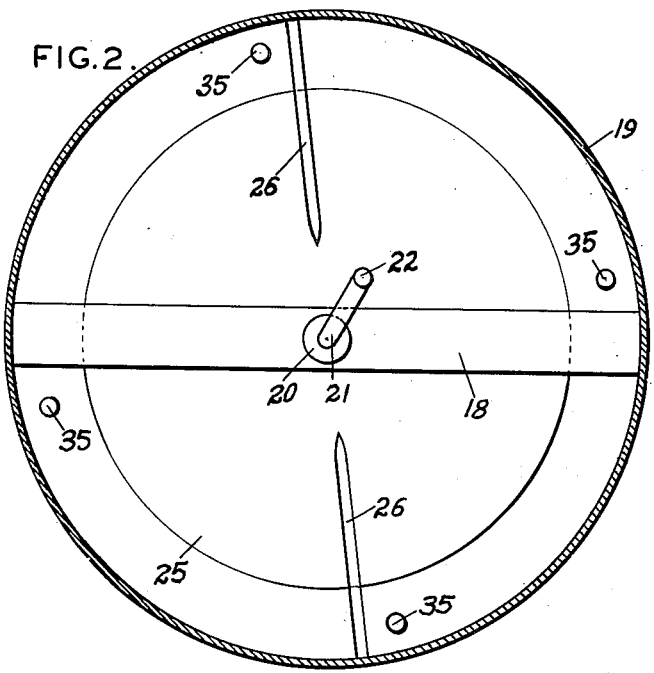
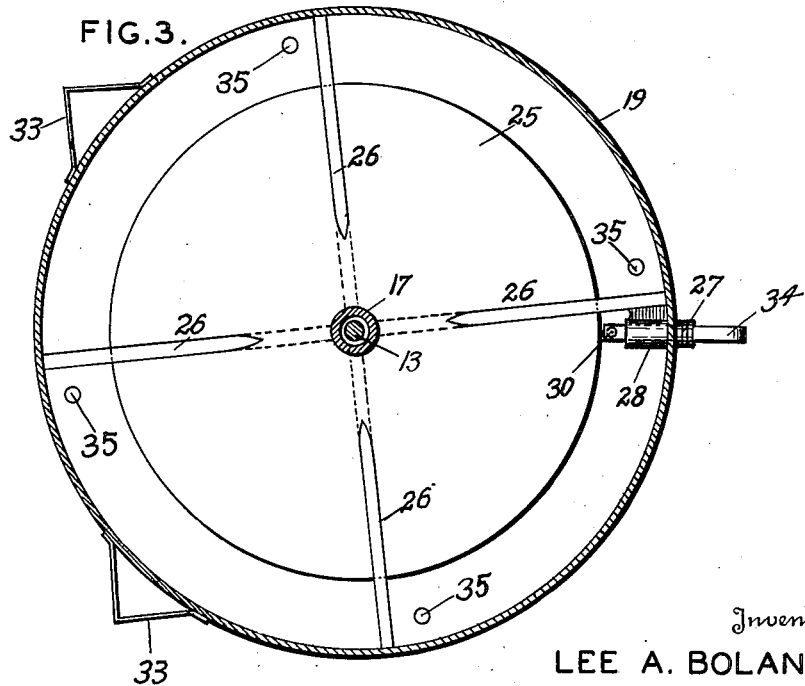

Patented Mar. 14, 1950

2,500,270

UNITED STATES PATENT OFFICE 2,500,270

HOG FEEDER

Lee A. Boland, San Diego, Calif.

Application November 20, 1945, Serial No. 629,779

1 Claim. (Cl. 119—53.5)

This invention relates to animal feeding devices, and more particularly to a hog feeder.

A main object of the invention is to provide a novel and improved livestock feeder of simple construction which has a large feed capacity and wherein waste of feed is substantially prevented.

A further object of the invention is to provide an improved hog feeder of the rotary type wherein feed is efficiently delivered to the feeding trough and wherein means for eliminating clogging of the feed is provided.

Further objects and advantages of the invention will appear from the following description and claims, and from the accompanying drawings, wherein:

Figure 2 is a cross-sectional view taken on line 2—2 of Figure 1.

Figure 3 is a cross-sectional view taken on line 3—3 of Figure 1.

Figure 1:
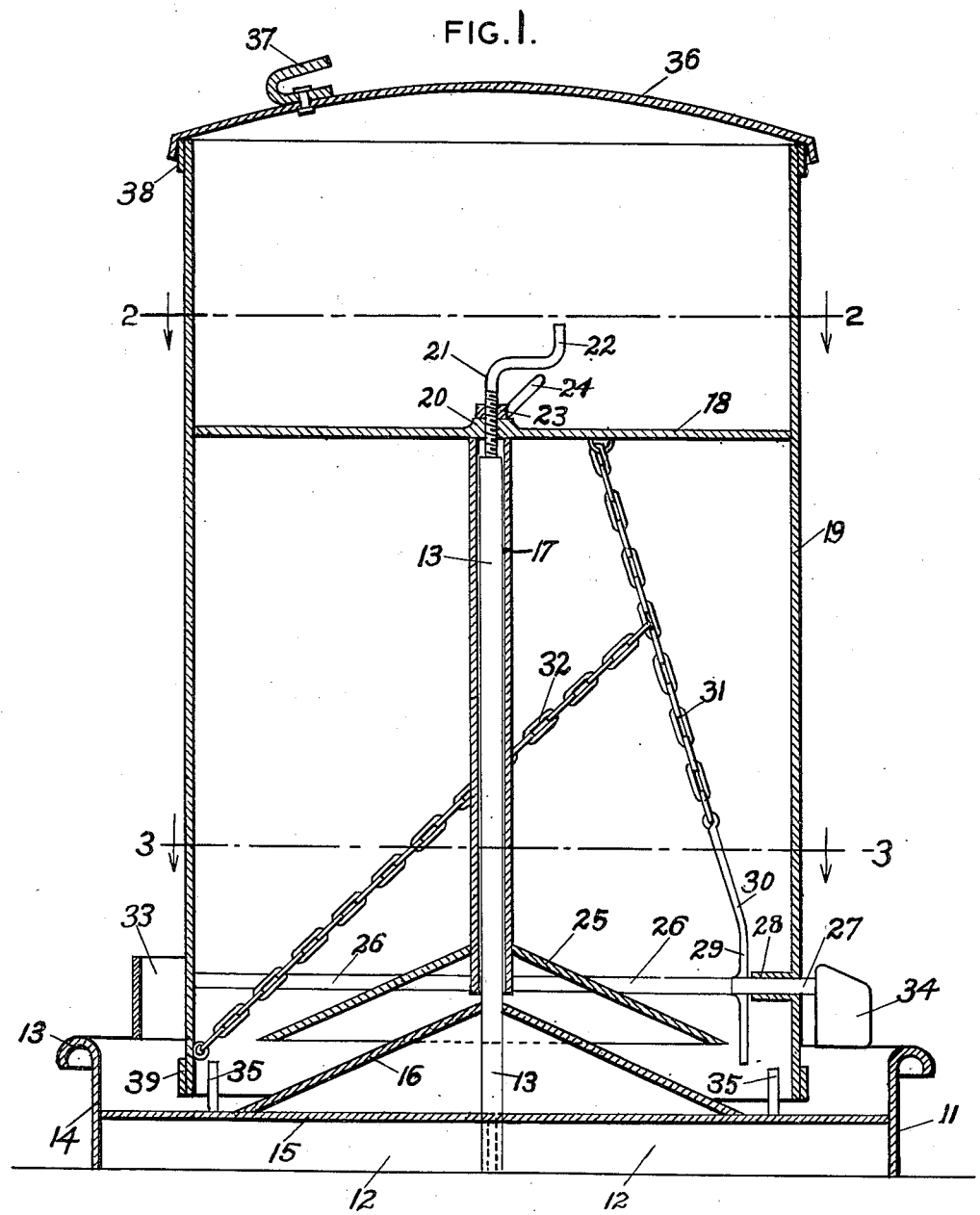
Figure 1 is a vertical cross-sectional view of a hog feeder constructed in accordance with this invention.

Referring to the drawings, 11 designates the base trough portion of the feeder device, said base portion comprising a plurality of radial horizontal support bars 12 welded at their inner ends to a vertical shaft 13 and welded at their outer ends to an annular vertical wall member 14 formed with an outwardly rolled peripheral top bead portion 13. Welded to and supported on radial bars 12, and welded to the inner wall surface of annular member 14 is a circular horizontal plate 15, and welded to shaft member 13 and supported on and welded to plate 15 is a conical member 16 coaxial with shaft 13.

Telescopically engaged with the upper portion of shaft 13 is a sleeve member 17 whose top end is welded to a transverse bar member 18. Secured to bar member 18, as by welding, is a cylindrical container member 19 arranged coaxially with shaft 13 and depending into the circular trough defined by annular member 14. Transverse bar member 18 is formed with a central vertically threaded boss 20 through which is threaded a bolt member 21 the lower end of which is rotatively supported on the top end of shaft 13, thus providing a pivot bearing for the cylindrical container 19 with respect to shaft 13. The top end of bolt member 21 is offset to define a handle portion 22 for manual adjustment of the height of container 19 with respect to the base trough 11 in accordance with the texture of the feed to be dispensed from the container. A locknut 23 provided with a wing lug 24 is threadedly engaged with bolt member 21 for locking said bolt member in adjusted position with respect to boss 20.

Welded to the lower portion of sleeve 17 is a conical baffle member 25 upon which the main bulk of the feed in container member 19 is supported, the periphery of said baffle member 25 being spaced from the internal wall surface of member 19 adjacent the lower edge portion thereof to allow feed to gravitate outwardly therefrom into the base trough 11.

Conical baffle member 25 is braced by a plurality of radial rod members 26 projecting therethrough and welded to said baffle member, and welded at their respective ends to sleeve 17 and the inner surface of container member 19.

Rotatably mounted in the lower wall portion of container member 19 is a short shaft member 27, said shaft member being supported in a sleeve 28 projecting inwardly from the wall of the container member and rigidly welded thereto and to the adjacent radial rod member 26. The shaft member 27 projects outwardly of container member 19 and carries at its outer end a depending lug element 34 held spaced from container member 19 by a plurality of washers on shaft 27. Secured to the inner end of shaft 27 is a vertical key member 29 formed with an upwardly projecting portion 30 to which is secured the lower link of a chain 31, the upper link of said chain being secured to bar member 18 adjacent the central portion thereof. An additional chain 32 is secured between the intermediate portion of chain 31 and the lower edge portion of container 19 substantially diametrically opposed to the location of shaft 27. A substantial amount of slack is left in chains 31 and 32 to provide effective agitating action thereof with respect to the feed in container 19 when said container is rotated on its pivot bearing.

Secured, as by welding, to the lower external portions of container 19 are a plurality of lug members 33, said lug members being located substantially at the same level as depending lug 34.

Projecting upwardly from plate 15 and inwardly spaced a short distance from the bottom peripheral edge of container 19 are a plurality of stationary agitating lugs 35 which facilitate the breaking up of masses of feed passing out of the container responsive to the rotation of said container on its pivot.

Mounted on the top rim of the container 19 is a removable, downwardly flanged cover member 36 which is provided with a handle 37.

Container 19 is strengthened at its top and bottom edges by external reinforcing rings 38 and 39 respectively welded to said edges.

In operation, a quantity of feed, such as grain, is deposited in container 19 after cover 36 has been lifted off. Locknut 23 is loosened and bolt member 21 is adjusted to a position such that the grain will flow freely past the bottom edge of container 19 into the base trough 11. Cover 36 is then replaced. As the feed in base trough 11 is consumed, additional feed will gravitate thereto from container 19. Contact of the animals with swingable lug member 34 will cause oscillation of agitator chains 31 and 32, thereby loosening the feed in the container. Contact of the animals with lug member 34 or with lug members 33 will also cause rotation of the container on its pivot bolt 21 with respect to stationary lugs 35, thus breaking up clogged masses of feed in the space between the bottom edge of container 19 and base trough 11. This provides a substantially continuous delivery of feed to the base trough during the feeding period, provided sufficient feed is available in the container.

Obviously, the agitation of the feed may be also accomplished by contacting lug member 34 and lug members 33 manually.

While a specific embodiment of an animal feeding device has been disclosed in the foregoing description, it will be understood that various modifications within the spirit of the invention may occur to those skilled in the art. Therefore it is intended that no limitations be placed on the invention other than as defined by the scope of the appended claim.

What is claimed is:

In an animal feeding device including a base trough, a vertical feed container open at the bottom thereof rotatably mounted on said trough and spaced upwardly from said trough, a conical baffle member arranged within said container adjacent to and spaced above the open bottom of said container and fixedly carried by the latter, said baffle member being spaced from the wall of said container, an element rotatably supported in the wall of said container adjacent the open bottom of the latter and having an end projecting exteriorly of said container wall, a lug dependingly supported on the projecting end of said element and fixedly secured thereto, a key member positioned on the other end of said element and fixedly secured to the latter, slack chain means fixedly supported within said container and operatively connected to said key member whereby contact of said lug by an animal feeding at said trough causes oscillation of said chain means and rotation of said container, and upwardly extending lugs arranged in spaced relation with respect to each other and fixedly supported on said trough for agitating the feed below the baffle member and between the container and trough when contact of said lug by the animal feeding at said trough causes the oscillation of said chain means and rotation of said container.

LEE A. BOLAND.

REFERENCES CITED

The following references are of record in the file of this patent:

UNITED STATES PATENTS

| Number | Name | Date |
|---|---|---|
| 1,344,789 | Burnett | June 29, 1920 |
| 1,392,004 | Fouts | Sept. 27, 1921 |
| 1,444,428 | Robbins | Feb. 6, 1928 |
| 2,309,997 | Thieman | Feb. 2, 1943 |

FOREIGN PATENTS

| Number | Country | Date |
|---|---|---|
| 713,353 | France | Aug. 11, 1931 |
| 113,992 | Australia | Oct. 23, 1941 |